(12) United States Patent
Greenwood

(10) Patent No.: US 9,436,672 B2
(45) Date of Patent: Sep. 6, 2016

(54) REPRESENTING AND MANIPULATING HIERARCHICAL DATA

(71) Applicant: David Paul Greenwood, Buderim (AU)

(72) Inventor: David Paul Greenwood, Buderim (AU)

(73) Assignee: POWER MODES PTY. LTD., Little Mountain, QLD (AU)

( * ) Notice: Subject to any disclaimer, the term of this patent is extended or adjusted under 35 U.S.C. 154(b) by 98 days.

(21) Appl. No.: 14/566,095

(22) Filed: Dec. 10, 2014

(65) Prior Publication Data

US 2015/0186352 A1 Jul. 2, 2015

Related U.S. Application Data

(60) Provisional application No. 61/914,622, filed on Dec. 11, 2013.

(51) Int. Cl.
| | | |
|---|---|---|
| G06F 17/22 | (2006.01) | |
| G06F 17/24 | (2006.01) | |
| G06F 17/30 | (2006.01) | |
| G06F 17/21 | (2006.01) | |

(52) U.S. Cl.
CPC ......... G06F 17/246 (2013.01); G06F 17/2247 (2013.01); G06F 17/30489 (2013.01); G06F 17/212 (2013.01)

(58) Field of Classification Search
CPC ........... G06F 17/30489; G06F 17/246; G06F 17/30572; G06F 17/2247; G06F 17/212
See application file for complete search history.

(56) References Cited

U.S. PATENT DOCUMENTS

| | | | | |
|---|---|---|---|---|
| 6,760,732 B2* | 7/2004 | Busshart | ............... | G06Q 10/10 |
| 7,035,843 B1* | 4/2006 | Bellamkonda | .... | G06F 17/30489 |
| 8,060,817 B2* | 11/2011 | Goldberg | ............... | G06F 17/245 715/200 |
| 8,185,817 B2* | 5/2012 | Collie | ................... | G06F 17/246 715/219 |
| 8,812,947 B1* | 8/2014 | Maoz | .................... | G06F 17/246 715/212 |
| 9,015,572 B2* | 4/2015 | Lanza | ................... | G06F 17/246 707/754 |
| 2003/0046295 A1* | 3/2003 | Busshart | ................ | G06Q 10/10 |
| 2005/0060647 A1* | 3/2005 | Doan | ................ | G06F 17/30557 715/205 |
| 2007/0050697 A1* | 3/2007 | Lewis-Bowen | ....... | G06F 17/246 715/212 |
| 2007/0239741 A1* | 10/2007 | Jordahl | ............ | G06F 17/30601 |
| 2009/0089662 A1* | 4/2009 | Wulkan | ................ | G06F 17/245 715/245 |
| 2009/0106310 A1* | 4/2009 | Lanza | ................... | G06F 17/246 |
| 2009/0319880 A1* | 12/2009 | Collie | ................... | G06F 17/246 715/219 |
| 2013/0145245 A1* | 6/2013 | Goldberg | ............... | G06F 17/245 715/212 |
| 2014/0067467 A1* | 3/2014 | Rangarajan | ............ | G06Q 30/02 705/7.31 |
| 2014/0115434 A1* | 4/2014 | Chirilov | ................ | G06F 17/246 715/217 |
| 2015/0339369 A1* | 11/2015 | Rais-Ghasem | ... | G06F 17/30589 707/739 |

* cited by examiner

Primary Examiner — Maikhanh Nguyen
(74) Attorney, Agent, or Firm — Tillman Wright, PLLC; Jeremy C. Doerre; Chad D. Tillman

(57) ABSTRACT

A methodology for representing hierarchical relationships between data in cells utilizes formatting of rows, columns, and cell borders, as well as blank rows. Such formatting and data table structure can be manipulated manually by a user, or automatically by software code, or via some combination of the two. The methodology involves first setting hierarchical relationships between columns or group of columns, or rows and groups of rows, in a spreadsheet or other document as levels and/or groups. Preferably, hierarchical relationships between data added to cells defined in different levels is represented by formatting a connecting border between cells in different levels with a line on either a left or right side (e.g. for columns) or a top or bottom (e.g. for rows).

20 Claims, 44 Drawing Sheets

*Prior Art*

| | A | B | C | D | E | F |
|---|---|---|---|---|---|---|
| 1 | Brand | Product | Category | Package | Size | Sales |
| 2 | Brand A | Product 1 | Soap | Box | 200g | $2,000 |
| 3 | Brand A | Product 2 | Shampoo | Bottle | 500ml | $1,050 |
| 4 | Brand B | Product 3 | Soap | Box | 300g | $1,200 |
| 5 | Brand A | Product 4 | Shampoo | Box | 300g | $1,400 |
| 6 | Brand B | Product 5 | Shampoo | Box | 200g | $350 |
| 7 | Brand A | Product 6 | Shampoo | Box | 300g | $900 |
| 8 | Brand B | Product 7 | Shampoo | Bottle | 500ml | $500 |

*FIG. 1*

*Prior Art*

|   | A | B | C | D | E |
|---|---|---|---|---|---|
| 1 | Brand | Category | Package | Size | Sales |
| 2 | Brand A | | | | |
| 3 | Product 1 | Soap | Box | 200g | $2,000 |
| 4 | Product 2 | Shampoo | Bottle | 500ml | $1,050 |
| 5 | Product 4 | Shampoo | Box | 300g | $1,400 |
| 6 | Product 6 | Shampoo | Box | 300g | $900 |
| 7 | Brand B | | | | |
| 8 | Product 3 | Soap | Box | 300g | $1,200 |
| 9 | Product 5 | Shampoo | Box | 200g | $350 |
| 10 | Product 7 | Shampoo | Bottle | 500ml | $500 |

*FIG. 2*

*Prior Art*

| | A | B | C | D | E | F |
|---|---|---|---|---|---|---|
| 1 | | Brand | Category | Package | Size | Sales |
| 2 | ⊟ | Brand A | | | | |
| 3 | | Product 1 | Soap | Box | 200g | $2,000 |
| 4 | | Product 2 | Shampoo | Bottle | 500ml | $1,050 |
| 5 | | Product 4 | Shampoo | Box | 300g | $1,400 |
| 6 | | Product 6 | Shampoo | Box | 300g | $900 |
| 7 | ⊟ | Brand B | | | | |
| 8 | | Product 3 | Soap | Box | 300g | $1,200 |
| 9 | | Product 5 | Shampoo | Box | 200g | $350 |
| 10 | | Product 7 | Shampoo | Bottle | 500ml | $500 |

*FIG. 3*

|  | A | B | C | D | E |
|---|---|---|---|---|---|
| 1 | Brand | Category | Package | Size | Sales |
| 2 | Brand A | | | | |
| 3 | Product 1 | Soap | Box | 200g | $2,000 |
| 4 | Product 2 | Shampoo | Bottle | 500ml | $1,050 |
| 5 | Product 4 | Shampoo | Box | 300g | $1,400 |
| 6 | Product 6 | Shampoo | Box | 300g | $900 |
| 7 | Brand B | | | | |
| 8 | Product 3 | Soap | Box | 300g | $1,200 |
| 9 | Product 5 | Shampoo | Box | 200g | $350 |
| 10 | Product 7 | Shampoo | Bottle | 500ml | $500 |

*Prior Art*

FIG. 4

*Prior Art*

| | A | B | C | D | E | F | G |
|---|---|---|---|---|---|---|---|
| 1 | Brand | Product | Category | Package | Size | Sales | |
| 2 | Brand A | Product 1 | Soap | Box | 200g | $2,000 | |
| 3 | Brand A | Product 2 | Shampoo | Bottle | 500ml | $1,050 | |
| 4 | Brand B | Product 3 | Soap | Box | 300g | $1,200 | |
| 5 | Brand A | Product 4 | Shampoo | Box | 300g | $1,400 | |
| 6 | Brand B | Product 5 | Shampoo | Box | 200g | $350 | |
| 7 | Brand A | Product 6 | Shampoo | Box | 300g | $900 | |
| 8 | Brand B | Product 7 | Shampoo | Bottle | 500ml | $500 | |

*FIG. 5*

*Prior Art*

|   | A | B | C | D | E | F |
|---|---|---|---|---|---|---|
| 1 | Brand | | | | | |
| 2 | Brand A | | | | | |
| 3 | | Product | Category | Package | Size | Sales |
| 4 | | Product 1 | Soap | Box | 200g | $2,000 |
| 5 | | Product 2 | Shampoo | Bottle | 500ml | $1,050 |
| 6 | | Product 4 | Shampoo | Box | 300g | $1,400 |
| 7 | | Product 6 | Shampoo | Box | 300g | $900 |
| 8 | Brand B | | | | | |
| 9 | | Product | Category | Package | Size | Sales |
| 10 | | Product 3 | Soap | Box | 300g | $1,200 |
| 11 | | Product 5 | Shampoo | Box | 200g | $350 |
| 12 | | Product 7 | Shampoo | Bottle | 500ml | $500 |

*FIG. 6*

*Prior Art*

| Pivot Table | Products | | | | | | |
|---|---|---|---|---|---|---|---|
| Brands | Product 1 | Product 2 | Product 3 | Product 4 | Product 5 | Product 6 | Product 7 |
| ⊟ Brand A | 2000 | 1050 | | 1400 | | 900 | |
| ⊟ Shampoo | | 1050 | | 1400 | | 900 | |
| ⊟ Bottle | | 1050 | | | | | |
| 500ml | | 1050 | | | | | |
| ⊟ Box | | | | 1400 | | 900 | |
| 300g | | | | 1400 | | 900 | |
| ⊟ Soap | 2000 | | | | | | |
| ⊟ Box | 2000 | | | | | | |
| 200g | 2000 | | | | | | |
| ⊟ Brand B | | | 1200 | | 350 | | 500 |
| ⊟ Shampoo | | | | | 350 | | 500 |
| ⊟ Bottle | | | | | | | |
| 500ml | | | | | 350 | | 500 |
| ⊟ Box | | | | | 350 | | |
| 200g | | | | | | | |
| ⊟ Soap | | | 1200 | | | | 500 |
| ⊟ Box | | | 1200 | | | | |
| 300g | | | 1200 | | | | |

Assign one or more columns to a first level.

| | B | C | D | E | F |
|---|---|---|---|---|---|
| | | Category | Package | Size | Sales |
| 1 | | | | | |
| 2 | Brand B | Soap | Box | 200g | $2,000 |
| 3 | Brand A | Shampoo | Bottle | 500ml | $1,050 |
| 4 | Brand B | Soap | Box | 300g | $1,200 |
| 5 | Brand A | Shampoo | Box | 300g | $1,400 |
| 6 | Brand B | Shampoo | Box | 200g | $350 |
| 7 | Brand A | Shampoo | Box | 300g | $900 |
| 8 | Brand B | Shampoo | Bottle | 500ml | $500 |

Cut
Copy
Paste
Insert
Delete
Clear
PowerOutline ▷  Set as Level 1
Format
Column Width
Hide
Unhide
Sort
Filter

Sort by the left-most column of the defined first level.

| | A | B | C | D | E | F |
|---|---|---|---|---|---|---|
| 1 | Brand | Product | Category | Package | Size | Sales |
| 2 | Brand A | Product 1 | Soap | Box | 200g | $2,000 |
| 3 | Brand A | Product 2 | Shampoo | Bottle | 500ml | $1,050 |
| 4 | Brand A | Product 4 | Shampoo | Box | 300g | $1,400 |
| 5 | Brand A | Product 6 | Shampoo | Box | 300g | $900 |
| 6 | Brand B | Product 3 | Soap | Box | 300g | $1,200 |
| 7 | Brand B | Product 5 | Shampoo | Box | 200g | $350 |
| 8 | Brand B | Product 7 | Shampoo | Bottle | 500ml | $500 |

*FIG. 10*

114 — Remove or hide duplicate data in the left-most column of the defined first level.

|   | A | B | C | D | E | F |
|---|---|---|---|---|---|---|
| 1 | Brand | Product | Category | Package | Size | Sales |
| 2 | Brand A | Product 1 | Soap | Box | 200g | $2,000 |
| 3 |  | Product 2 | Shampoo | Bottle | 500ml | $1,050 |
| 4 |  | Product 4 | Shampoo | Box | 300g | $1,400 |
| 5 |  | Product 6 | Shampoo | Box | 300g | $900 |
| 6 | Brand B | Product 3 | Soap | Box | 300g | $1,200 |
| 7 |  | Product 5 | Shampoo | Box | 200g | $350 |
| 8 |  | Product 7 | Shampoo | Bottle | 500ml | $500 |

Format the connecting border to the right of the right-most column of the defined first level.

| | A | B | C | D | E | F |
|---|---|---|---|---|---|---|
| 1 | Brand | Product | Category | Package | Size | Sales |
| 2 | Brand A | Product 1 | Soap | Box | 200g | $2,000 |
| 3 | | Product 2 | Shampoo | Bottle | 500ml | $1,050 |
| 4 | | Product 4 | Shampoo | Box | 300g | $1,400 |
| 5 | | Product 6 | Shampoo | Box | 300g | $900 |
| 6 | Brand B | Product 3 | Soap | Box | 300g | $1,200 |
| 7 | | Product 5 | Shampoo | Box | 200g | $350 |
| 8 | | Product 7 | Shampoo | Bottle | 500ml | $500 |

*FIG. 12*

118 — Insert a blank row above each branch of the defined first level.

| | A | B | C | D | E | F |
|---|---|---|---|---|---|---|
| 1 | Brand | Product | Category | Package | Size | Sales |
| 2 | | | | | | |
| 3 | Brand A | Product 1 | Soap | Box | 200g | $2,000 |
| 4 | | Product 2 | Shampoo | Bottle | 500ml | $1,050 |
| 5 | | Product 4 | Shampoo | Box | 300g | $1,400 |
| 6 | | Product 6 | Shampoo | Box | 300g | $900 |
| 7 | | | | | | |
| 8 | Brand B | Product 3 | Soap | Box | 300g | $1,200 |
| 9 | | Product 5 | Shampoo | Box | 200g | $350 |
| 10 | | Product 7 | Shampoo | Bottle | 500ml | $500 |

*FIG. 13*

|   | A | B | C | D | E | F |
|---|---|---|---|---|---|---|
| 1 | Brand | Category | Package | Product | Size | Sales |
| 2 | Brand A | | | | | |
| 3 | | Soap | Box | Product 1 | 200g | $2,000 |
| 4 | | Shampoo | Bottle | Product 2 | 500ml | $1,050 |
| 5 | | Shampoo | Box | Product 4 | 300g | $1,400 |
| 6 | | Shampoo | Box | Product 6 | 300g | $900 |
| 7 | Brand B | | | | | |
| 8 | | Soap | Box | Product 3 | 300g | $1,200 |
| 9 | | Shampoo | Box | Product 5 | 200g | $350 |
| 10 | | Shampoo | Bottle | Product 7 | 500ml | $500 |

Move the "Product" column containing unique entries to the right.

*FIG. 14*

| | A | | C | D | E | F |
|---|---|---|---|---|---|---|
| | Brand | | kage | Product | Size | Sales |
| 1 | | | | | | |
| 2 | Brand A | Shampoo | ox | Product 1 | 200g | $2,000 |
| 3 | | Shampoo | Bottle | Product 2 | 500ml | $1,050 |
| 4 | | Shampoo | Box | Product 4 | 300g | $1,400 |
| 5 | | Shampoo | Box | Product 6 | 300g | $900 |
| 6 | Brand B | Soap | Box | Product 3 | 300g | $1,200 |
| 7 | | Shampoo | Box | Product 5 | 200g | $350 |
| 8 | | Shampoo | Bottle | Product 7 | 500ml | $500 |

Menu:
- Cut
- Copy
- Paste
- Insert
- Delete
- Clear
- PowerOutline ▷
  - Set as Level 1
  - Set as Level 2
- Format
- Column Width
- Hide
- Unhide
- Sort
- Filter 120 — Assign one or more columns to a second level.

*FIG. 15*

122 — Sort by the left-most column of the defined second level.

|   | A | B | C | D | E | F |
|---|---|---|---|---|---|---|
| 1 | Brand | Category | Package | Product | Size | Sales |
| 2 | Brand A | | | | | |
| 3 | | Shampoo | Bottle | Product 2 | 500ml | $1,050 |
| 4 | | Shampoo | Box | Product 4 | 300g | $1,400 |
| 5 | | Shampoo | Box | Product 6 | 300g | $900 |
| 6 | | Soap | Box | Product 1 | 200g | $2,000 |
| 7 | | | | | | |
| 8 | Brand B | Shampoo | Box | Product 5 | 200g | $350 |
| 9 | | Shampoo | Bottle | Product 7 | 500ml | $500 |
| 10 | | Soap | Box | Product 3 | 300g | $1,200 |

Remove or hide duplicate data in the left-most column of the defined second level.

| | A | B | C | D | E | F |
|---|---|---|---|---|---|---|
| 1 | Brand | Category | Package | Product | Size | Sales |
| 2 | | | | | | |
| 3 | Brand A | Shampoo | Bottle | Product 2 | 500ml | $1,050 |
| 4 | | | Box | Product 4 | 300g | $1,400 |
| 5 | | | Box | Product 6 | 300g | $900 |
| 6 | | Soap | Box | Product 1 | 200g | $2,000 |
| 7 | | | | | | |
| 8 | Brand B | Shampoo | Box | Product 5 | 200g | $350 |
| 9 | | | Bottle | Product 7 | 500ml | $500 |
| 10 | | Soap | Box | Product 3 | 300g | $1,200 |

*FIG. 17*

| | A | B | C | D | E | F |
|---|---|---|---|---|---|---|
| 1 | Brand | Category | Package | Product | Size | Sales |
| 2 | | | | | | |
| 3 | Brand A | Shampoo | Bottle | Product 2 | 500ml | $1,050 |
| 4 | | | Box | Product 4 | 300g | $1,400 |
| 5 | | | Box | Product 6 | 300g | $900 |
| 6 | | | | | | |
| 7 | | Soap | Box | Product 1 | 200g | $2,000 |
| 8 | | | | | | |
| 9 | Brand B | Shampoo | Box | Product 5 | 200g | $350 |
| 10 | | | Bottle | Product 7 | 500ml | $500 |
| 11 | | | | | | |
| 12 | | Soap | Box | Product 3 | 300g | $1,200 |

126 — Format the connecting border to the right of the right-most column of the defined second level.

→

128 — Insert a blank row between branches of the defined second level.

*FIG. 18*

132 — Sort by the left-most column of the defined third level.

| | A | B | C | D | E | F |
|---|---|---|---|---|---|---|
| 1 | Brand | Category | Package | Product | Size | Sales |
| 2 | Brand A | Shampoo | Box | Product 4 | 300g | $1,400 |
| 3 | | | Box | Product 6 | 300g | $900 |
| 4 | | | Bottle | Product 2 | 500ml | $1,050 |
| 5 | | Soap | Box | Product 1 | 200g | $2,000 |
| 6 | Brand B | Shampoo | Box | Product 5 | 200g | $350 |
| 7 | | | Bottle | Product 7 | 500ml | $500 |
| 8 | | Soap | Box | Product 3 | 300g | $1,200 |

FIG. 20

134 — Remove or hide duplicate data in the left-most column of the defined third level.

| | A | B | C | D | E | F |
|---|---|---|---|---|---|---|
| 1 | Brand | Category | Package | Product | Size | Sales |
| 2 | | | | | | |
| 3 | Brand A | Shampoo | Box | Product 4 | 300g | $1,400 |
| 4 | | | | Product 6 | 300g | $900 |
| 5 | | | Bottle | Product 2 | 500ml | $1,050 |
| 6 | | | | | | |
| 7 | | Soap | Box | Product 1 | 200g | $2,000 |
| 8 | | | | | | |
| 9 | Brand B | Shampoo | Box | Product 5 | 200g | $350 |
| 10 | | | Bottle | Product 7 | 500ml | $500 |
| 11 | | | | | | |
| 12 | | Soap | Box | Product 3 | 300g | $1,200 |

FIG. 21

|   | A | B | F |
|---|---|---|---|
| 1 | Brand | Category | Sales |
| 2 | | | |
| 3 | Brand A | Shampoo | $3,350 |
| 4 | | Soap | $2,000 |
| 5 | | | |
| 6 | Brand B | Shampoo | $850 |
| 7 | | Soap | $1,200 |
| 8 | | | |

*FIG. 24*

| | A | B | C | D | E | F |
|---|---|---|---|---|---|---|
| 1 | Brand | Category | Package | Product | Size | Sales |
| 2 | | | | | | |
| 3 | Brand A | Shampoo | Box | Product 4 | 300g | $1,400 |
| 4 | | | | Product 6 | 300g | $900 |
| 5 | | | Bottle | Product 2 | 500ml | $1,050 |
| 6 | | Soap | Box | Product 1 | 200g | $2,000 |
| 7 | | | | | | |
| 8 | | | | | | |
| 9 | | | | | | |
| 10 | Brand B | Shampoo | Box | Product 5 | 200g | $350 |
| 11 | | | Bottle | Product 7 | 500ml | $500 |
| 12 | | Soap | Box | Product 3 | 300g | $1,200 |
| 13 | | | | | | |
| 14 | | | | | | |

Sort (Hidden) | Filter (Hidden)

*FIG. 25*

| ▲ | A | B | | E | F | | Sort (Hidden) | Filter (Hidden) |
|---|---|---|---|---|---|---|---|---|
| 1 | Brand | Category | Pac... | Size | Sales | | | |
| 2 | Brand A | Shampoo | B... | 300g | $1,400 | | | |
| 3 | | | | 300g | $900 | | | |
| 4 | | | | | | | | |
| 5 | | | Bottle | | | Product 2 | | |
| 6 | | Soap | Box | 500ml | $1,050 | Product 1 | | |
| 7 | | | | | | | | |
| 8 | | | | 200g | $2,000 | Product 5 | | |
| 9 | Brand B | Shampoo | Box | 200g | $350 | Product 7 | | |
| 10 | | | | | | | | |
| 11 | | | Bottle | 500ml | $500 | | | |
| 12 | | Soap | Box | 300g | $1,200 | Product 3 | | |
| 13 | | | | | | | | |
| 14 | | | | | | | | |

Menu:
- Cut
- Copy
- Paste
- Insert
- Delete
- Clear
- PowerOutline ▷
- Format
- Column Width
- Hide
- Unhide
- Sort ▸
- Filter

*FIG. 26*

| | A | B | C | D | E | F | | Sort (Hidden) | Filter (Hidden) |
|---|---|---|---|---|---|---|---|---|---|
| 1 | Brand | Category | Package | Product | Size | Sales | | AAAAAA | |
| 2 | Brand A | Shampoo | Box | Product 4 | 300g | $1,400 | | AAAAAD | |
| 3 | | | | Product 6 | 300g | $900 | | AAAAAE | |
| 4 | | | Bottle | Product 2 | 500ml | $1,050 | | AAAAAB | |
| 5 | | Soap | Box | Product 1 | 200g | $2,000 | | AAAAAG | |
| 6 | Brand B | Shampoo | Box | Product 5 | 200g | $350 | | AAAAAH | |
| 7 | | | Bottle | Product 7 | 500ml | $500 | | AAAAAI | |
| 8 | | Soap | Box | Product 3 | 300g | $1,200 | | AAAAAM | |

FIG. 27

| | A | B | C | D | E | F | | Sort (Hidden) | Filter (Hidden) |
|---|---|---|---|---|---|---|---|---|---|
| 1 | Brand | Category | Package | Product | Size | Sales | | AAAAAA | |
| 2 | | | | | | | | AAAAAB | |
| 3 | Brand A | Shampoo | Bottle | Product 2 | 500ml | $1,050 | | AAAAAC | |
| 4 | | | | | | | | AAAAAD | |
| 5 | | | Box | Product 4 | 300g | $1,400 | | AAAAAE | |
| 6 | | | | Product 6 | 300g | $900 | | AAAAAF | |
| 7 | | | | | | | | AAAAAG | |
| 8 | | Soap | Box | Product 1 | 200g | $2,000 | | AAAAAH | |
| 9 | | | | | | | | AAAAAI | |
| 10 | Brand B | Shampoo | Bottle | Product 7 | 500ml | $500 | | AAAAAJ | |
| 11 | | | Box | Product 5 | 200g | $350 | | AAAAAK | |
| 12 | | | | | | | | AAAAAL | |
| 13 | | | | | | | | AAAAAM | |
| 14 | | Soap | Box | Product 3 | 300g | $1,200 | | | |

*FIG. 28*

| | A | B | D | E | F | | Sort (Hidden) | Filter (Hidden) |
|---|---|---|---|---|---|---|---|---|
| 1 | Brand | Category | Product | Size | Sales | | | |
| 2 | Brand A | Shampoo | | | | | | |
| 3 | | | Product 4 | 300g | $1,400 | | | |
| 4 | | | Product 6 | 300g | $900 | | | |
| 5 | | | | | | | | |
| 6 | | Soap | Product 2 | 500ml | $1,050 | | | |
| 7 | | | Product 1 | 200g | $2,000 | | | |
| 8 | Brand B | Shampoo | Product 5 | 200g | $350 | | | |
| 9 | | | Product 7 | 500ml | $500 | | | |
| 10 | | | | | | | | |
| 11 | | | | | | | | |
| 12 | | Soap | Product 3 | 300g | $1,200 | | | |
| 13 | | | | | | | | |
| 14 | | | | | | | | |

Context menu overlay:
- Cut
- Copy
- Paste
- Insert
- Delete
- Clear
- PowerOutline ▷
- Format
- Column Width
- Hide
- Unhide
- Sort
- Filter ▸

*FIG. 29*

| | A | B | C | D | E | F | Sort (Hidden) | Filter (Hidden) |
|---|---|---|---|---|---|---|---|---|
| 1 | Brand | Category | Package | Product | Size | Sales | | |
| 2 | | | | | | | | |
| 3 | Brand A | Shampoo | Box | Product 4 | 300g | $1,400 | | 1 |
| 4 | | | | Product 6 | 300g | $900 | | 1 |
| 5 | | | | | | | | |
| 6 | | | Bottle | Product 2 | 500ml | $1,050 | | 1 |
| 7 | | | | | | | | |
| 8 | | Soap | Box | Product 1 | 200g | $2,000 | | 0 |
| 9 | | | | | | | | |
| 10 | Brand B | Shampoo | Box | Product 5 | 200g | $350 | | 1 |
| 11 | | | | | | | | |
| 12 | | | Bottle | Product 7 | 500ml | $500 | | 1 |
| 13 | | | | | | | | |
| 14 | | Soap | Box | Product 3 | 300g | $1,200 | | 0 |

*FIG. 30*

|   | A | B | C | D | E | F |
|---|---|---|---|---|---|---|
| 1 | Brand | Category | Package | Product | Size | Sales |
| 2 | | | | | | |
| 3 | Brand A | Shampoo | Box | Product 4 | 300g | $1,400 |
| 4 | | | | Product 6 | 300g | $900 |
| 5 | | | Bottle | Product 2 | 500ml | $1,050 |
| 6 | | | | | | |
| 9 | | | | | | |
| 10 | Brand B | Shampoo | Box | Product 5 | 200g | $350 |
| 11 | | | | | | |
| 12 | | | Bottle | Product 7 | 500ml | $500 |
| 15 | | | | | | |

| Sort (Hidden) | Filter (Hidden) |
|---|---|
| | 1 |
| | 1 |
| | 1 |
| | 1 |
| | 1 |
| | 1 |

|   | A | B | C |
|---|---|---|---|
| 1 | Brand | | |
| 2 | | | |
| 3 | | | |
| 4 | | | |
| 5 | | | |
| 6 | | | |
| 7 | | | |
| 8 | | | |

FIG. 33

|   | A | B | C |
|---|---|---|---|
| 1 | Brand | Product | |
| 2 | | | |
| 3 | | | |
| 4 | | | |
| 5 | | | |
| 6 | | | |
| 7 | | | |
| 8 | | | |

|   | A | B | C |
|---|---|---|---|
| 1 | Brand | Product | |
| 2 | Brand A | Product 1 | |
| 3 | | Product 2 | |
| 4 | | | |
| 5 | Brand B | Product 3 | |
| 6 | | | |
| 7 | | | |
| 8 | | | |

*FIG. 42*

REPRESENTING AND MANIPULATING HIERARCHICAL DATA

CROSS-REFERENCE TO RELATED APPLICATION

The present application is a U.S. nonprovisional patent application of, and claims priority under 35 U.S.C. §119(e) to, U.S. provisional patent application Ser. No. 61/914,622, filed Dec. 11, 2013, which provisional patent application is incorporated by reference herein. A copy of this provisional patent application is attached hereto as Appendix A, the disclosure of which is hereby incorporated herein by reference. Additionally, the entire disclosure of Appendix B attached hereto is hereby incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to the use of data tables to represent and manipulate hierarchical data in spreadsheet and database software applications and interfaces.

There exist a wide variety of spreadsheet and database software which can render data and provide an interface for a user to input and manipulate data in a variety of forms, including tables (e.g. sheets and grids), forms, charts, and reports.

Such software can provide two-dimensional data tables comprising a matrix of cells arranged in rows and columns in which a user can insert numbers, text, graphics, functions, and formulas. Such software can allow commands to be inserted and used by the software to calculate or render data or execute an action. FIG. 1 illustrates an exemplary two-dimensional data table.

Typically, a software application provides extensive formatting options for a data table whereby a user, or software functions, can modify the color, font, size, alignment, content type and more of individual cells, rows and columns directly, or conditionally based on parameters.

Generally, a data table structure provides a rigid matrix whereby changing the width of a column changes the width of all cells in that column, and, similarly, changing the height of a row changes the height of all cells in that row.

Spreadsheets and databases use data tables to represent data and they can also organize that data as hierarchical information structures to show relationships.

Various methods and systems exist to represent and manipulate data hierarchies in data tables. These can generally be described as outlining systems.

Exemplary outlining capabilities that might be desired by a user include: creating hierarchies from tables from data that show how items (rows and columns) are related; selecting multiple items (e.g. rows); displaying additional rows or columns for summary data, totals or other metadata; displaying headings adjacent to relevant data; and maintaining hierarchies when items are added, moved, deleted and hidden.

There are a limited number of outlining systems available that are either manually applied to data by a user, or automatically applied by software using algorithms and rules.

Currently available outlining systems generally provide these capabilities by representing levels in a hierarchical relationship by indenting row content or grouping rows or columns.

For example, FIG. 2 illustrates an exemplary formatted data table based on the data included in the data table of FIG. 1 where an outlining system involving the indentation of cell data has been utilized. As illustrated, rather than having a first column for a "Brand" identification and a second column for a "Product" identification, the data table of FIG. 2 groups rows by their brand identification and includes that brand identification in a row before the grouped rows.

FIG. 3 illustrates another exemplary formatted data table based on the data included in the data table of FIG. 1 where an outlining system is utilized that includes internal grouping functionality.

FIG. 4 illustrates another exemplary formatted data table based on the data included in the data table of FIG. 1 where an outlining system is utilized that includes external vertical grouping functionality, and FIG. 5 illustrates yet another exemplary formatted data table based on the data included in the data table of FIG. 1 where a similar outlining system is utilized that includes external horizontal grouping functionality.

FIG. 6 illustrates another exemplary formatted data table based on the data included in the data table of FIG. 1 where an outlining system is utilized that includes sub-grid functionality.

FIG. 7 illustrates another exemplary formatted data table based on the data included in the data table of FIG. 1 where an outlining system is utilized that includes pivot table functionality.

While known outlining systems can be useful, they can require the indentation of cell data that increases cell width and overall area to represent a hierarchy, require the use of additional connecting lines and buttons to be added to a spreadsheet or grid, require the use of an expand and collapse control external to a spreadsheet or grid, require use of sub-grids limited by column widths applied to all cells in the same column, and disperse data in a sparse matrix that can make review more difficult.

A need exists for improvement in data outlining systems. This, and other needs, are addressed by one or more aspects of the present invention.

SUMMARY OF THE INVENTION

The present invention includes many aspects and features. Moreover, while many aspects and features relate to, and are described in, the context of data tables, the present invention is not limited to use only in this context, as will become apparent from the following summaries and detailed descriptions of aspects, features, and one or more embodiments of the present invention.

Accordingly, one aspect of the present invention relates to a method for converting a data table to a data table graphically presenting hierarchical relationships. The method includes displaying, to a user via a display associated with an electronic device, a data table comprising a plurality of rows and columns defining a plurality of cells; receiving, from the user via one or more input devices associated with the electronic device, an indication to assign a first set of one or more columns of the plurality of columns to a first level;

automatically sorting, in response to the received indication to assign the first set of columns to the first level, the data table based on data in a left-most column of the first set of columns; automatically determining one or more groups of rows having duplicate data in the left-most column of the first set of columns, and, for each group, removing duplicate values in subsequent rows after the first row; automatically formatting a connecting border to the right of the right-most column of the first set of columns such that a connecting line is established connecting the right-most column of the first set of columns and one or more associated cells in the column immediately to the right of the right-most column of the first set of columns; inserting one or more blank rows separating the one or more groups of rows found to have duplicate data in the left-most column of the first set of columns; receiving, from the user via one or more input devices associated with the electronic device, an indication to assign a second set of one or more columns of the plurality of columns to a second level; in response to the received indication to assign the second set of columns to the second level, for each group of cells associated with the same parent group in the first level, sorting the data table based on data in a left-most column of the second set of columns, such sorting only sorting together cells associated with the same parent group in the first level; automatically determining one or more groupings of rows having duplicate data in the left-most column of the second set of columns, and, for each grouping, removing duplicate values in subsequent rows after the first row; automatically formatting a connecting border to the right of the right-most column of the second set of columns such that a connecting line is established connecting the right-most column of the second set of columns and one or more associated cells in the column immediately to the right of the right-most column of the second set of columns; and inserting one or more blank rows separating the one or more groupings of rows found to have duplicate data in the left-most column of the second set of columns.

In a feature of this aspect, the electronic device comprises a computer.

In a feature of this aspect, the electronic device comprises a laptop.

In a feature of this aspect, the electronic device comprises a tablet computer.

In a feature of this aspect, the electronic device comprises a smart phone.

In a feature of this aspect, receiving, from the user via one or more input devices associated with the electronic device, an indication to assign a first set of one or more columns of the plurality of columns to a first level comprises receiving input from the user via a mouse.

In a feature of this aspect, receiving, from the user via one or more input devices associated with the electronic device, an indication to assign a first set of one or more columns of the plurality of columns to a first level comprises receiving input from the user via a mouse and keyboard.

In a feature of this aspect, receiving, from the user via one or more input devices associated with the electronic device, an indication to assign a first set of one or more columns of the plurality of columns to a first level comprises receiving input from the user via a touchscreen.

In a feature of this aspect, displaying, to a user via a display associated with an electronic device, a data table comprising a plurality of rows and columns defining a plurality of cells comprises displaying, to a user, an interface of a spreadsheet software application.

In a feature of this aspect, displaying, to a user via a display associated with an electronic device, a data table comprising a plurality of rows and columns defining a plurality of cells comprises displaying, to a user, an interface of a spreadsheet software application installed on the electronic device.

In a feature of this aspect, displaying, to a user via a display associated with an electronic device, a data table comprising a plurality of rows and columns defining a plurality of cells comprises displaying, to a user, an interface of a spreadsheet software application loaded from a remote server.

In a feature of this aspect, displaying, to a user via a display associated with an electronic device, a data table comprising a plurality of rows and columns defining a plurality of cells comprises displaying, to a user, a spreadsheet loaded from a remote server.

In a feature of this aspect, the method further includes hiding one or more columns of the data table, and, in response thereto, adjusting display of one or more rows of the data table.

In a feature of this aspect, the method further includes hiding one or more levels of the data table.

In a feature of this aspect, the method further includes receiving user input corresponding to an indication to sort the data table by a particular column, and, in response thereto, modifying values in a hidden column and sorting based on the hidden column.

In a feature of this aspect, the method further includes receiving user input corresponding to an indication to filter the data table, and, in response thereto, modifying values in a hidden column and changing the visibility of one or more rows based on the hidden column.

Another aspect relates to a method for converting a data table to a data table graphically presenting hierarchical relationships. The method includes loading, at an electronic device, data into a data table comprising a plurality of rows and columns defining a plurality of cells; automatically determining a first set of one or more columns of the plurality of columns to assign to a first level; automatically sorting, in response to the determination to assign the first set of columns to the first level, the data table based on data in a left-most column of the first set of columns; automatically determining one or more groups of rows having duplicate data in the left-most column of the first set of columns, and, for each group, removing duplicate values in subsequent rows after the first row; automatically formatting a connecting border to the right of the right-most column of the first set of columns such that a connecting line is established connecting the right-most column of the first set of columns and one or more associated cells in the column immediately to the right of the right-most column of the first set of columns; inserting one or more blank rows separating the one or more groups of rows found to have duplicate data in the left-most column of the first set of columns; automatically determining a second set of one or more columns of the plurality of columns to assign to a second level; in response to the determination to assign the second set of columns to the second level, for each group of cells associated with the same parent group in the first level, sorting the data table based on data in a left-most column of the second set of columns, such sorting only sorting together cells associated with the same parent group in the first level; automatically determining one or more groupings of rows having duplicate data in the left-most column of the second set of columns, and, for each grouping, removing duplicate values in subsequent rows after the first row; automatically formatting a connecting border to the right of the right-most column of the second set of columns such that a connecting line is established connecting the right-most column of the second set of columns and one or more associated cells in the column immediately to the right of the right-most column of the second set of columns; and inserting one or more blank rows separating the one or more groupings of rows found to have duplicate data in the left-most column of the second set of columns.

Another aspect relates to a method for converting a data table to a data table graphically presenting hierarchical relationships. The method includes loading, at an electronic device, data into a data table comprising a plurality of rows and columns defining a plurality of cells; accessing, at the electronic device, specification data configured for use in assigning columns to levels; determining, based on the accessed specification data, a first set of one or more columns of the plurality of columns to assign to a first level; automatically sorting, in response to the determination to assign the first set of columns to the first level, the data table based on data in a left-most column of the first set of columns; automatically determining one or more groups of rows having duplicate data in the left-most column of the first set of columns, and, for each group, removing duplicate values in subsequent rows after the first row; automatically formatting a connecting border to the right of the right-most column of the first set of columns such that a connecting line is established connecting the right-most column of the first set of columns and one or more associated cells in the column immediately to the right of the right-most column of the first set of columns; inserting one or more blank rows separating the one or more groups of rows found to have duplicate data in the left-most column of the first set of columns; determining, based on the accessed specification data, a second set of one or more columns of the plurality of columns to assign to a second level; in response to the determination to assign the second set of columns to the second level, for each group of cells associated with the same parent group in the first level, sorting the data table based on data in a left-most column of the second set of columns, such sorting only sorting together cells associated with the same parent group in the first level; automatically determining one or more groupings of rows having duplicate data in the left-most column of the second set of columns, and, for each grouping, removing duplicate values in subsequent rows after the first row; automatically formatting a connecting border to the right of the right-most column of the second set of columns such that a connecting line is established connecting the right-most column of the second set of columns and one or more associated cells in the column immediately to the right of the right-most column of the second set of columns; inserting one or more blank rows separating the one or more groupings of rows found to have duplicate data in the left-most column of the second set of columns.

Another aspect relates to a non-transitory computer readable medium containing computer executable instructions for performing a disclosed method.

In a feature of this aspect, the computer readable medium forms part of a computer associated with a display and one or more input devices.

In a feature of this aspect, the computer readable medium forms part of a server.

One or more aspects of the present invention relate to novel computer implemented methods and processes of representing hierarchical relationships between data in cells using rows, columns, cell borders and blank rows in a spreadsheet or grid that can be manipulated by a user or software code.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein:

FIG. 1 illustrates an exemplary data table;

FIG. 2 illustrates an exemplary formatted data table based on the data included in the data table of FIG. 1 where an outlining system involving the indentation of cell data has been utilized;

FIG. 3 illustrates another exemplary formatted data table based on the data included in the data table of FIG. 1 where an outlining system is utilized that includes internal grouping functionality;

FIG. 4 illustrates another exemplary formatted data table based on the data included in the data table of FIG. 1 where an outlining system is utilized that includes external vertical grouping functionality;

FIG. 5 illustrates yet another exemplary formatted data table based on the data included in the data table of FIG. 1 where a similar outlining system is utilized that includes external horizontal grouping functionality;

FIG. 6 illustrates another exemplary formatted data table based on the data included in the data table of FIG. 1 where an outlining system is utilized that includes sub-grid functionality;

FIG. 7 illustrates another exemplary formatted data table based on the data included in the data table of FIG. 1 where an outlining system is utilized that includes pivot table functionality;

FIGS. 9-13 illustrate exemplary steps in accordance with the exemplary methodology of FIG. 8B;

FIG. 14 illustrates movement of a column;

FIGS. 15-22 illustrate exemplary steps in accordance with the exemplary methodology of FIG. 8B;

FIGS. 23-24 illustrate hide functionality in accordance with one or more preferred implementations;

FIGS. 25-28 illustrate sort functionality in accordance with one or more preferred implementations;

FIGS. 29-31 illustrate filter functionality in accordance with one or more preferred implementations;

FIGS. 32-42 illustrate development of a blank data table into a data table including a representation of hierarchical relationships based on user input.

DETAILED DESCRIPTION

Figure 8A:
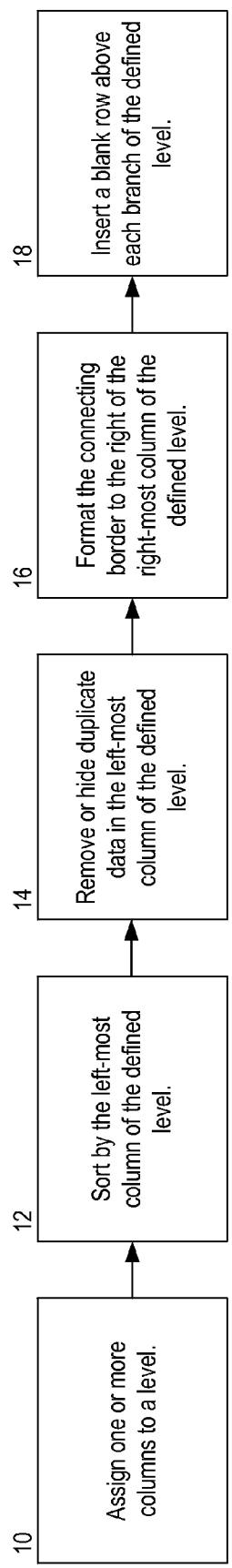
FIG. 8A illustrates an exemplary methodology for creating and representing hierarchical relationships between columns in a data table in accordance with one or more preferred implementations.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention in any claim of a patent issuing here from, which scope is to be defined by the claims and the equivalents thereof. It is not intended that the scope of patent protection afforded the present invention be defined by reading into any claim a limitation found herein that does not explicitly appear in the claim itself Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. 112, paragraph 6 or subsection (f), no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

As noted above, spreadsheets and databases commonly use data tables to represent data, and such data tables can be organized using hierarchical information structures to show relationships.

In accordance with one or more preferred implementations, a methodology for representing hierarchical relationships between data in cells utilizes formatting of rows, columns, and cell borders, as well as blank rows. Such formatting and data table structure can be manipulated manually by a user, or automatically by software code, or via some combination of the two.

In one or more preferred implementations, a methodology involves first setting hierarchical relationships between columns or group of columns, or rows and groups of rows, in a spreadsheet or other document as levels and/or groups.

In one or more preferred implementations, hierarchical relationships between data added to cells defined in different levels is represented by formatting a connecting border between cells in different levels with a line on either a left or right side (e.g. for columns) or a top or bottom (e.g. for rows). In one or more preferred implementations, where a value for different entries at a level are the same, the entries are characterized as representing a branch (e.g. rows that have the same value in a column form a branch).

In one or more preferred implementations, a blank row or column is utilized to separate different branches in a hierarchy.

FIG. 8A illustrates an exemplary methodology for creating and representing hierarchical relationships between columns in a data table in accordance with one or more preferred implementations. Although described in detail in the context of columns, in one or more preferred implementations, a similar methodology is utilized for rows. The methodology involves assigning one or more columns to a level at step 10, sorting data by the left-most column of the defined level at step 12, removing or hiding duplicate data in the left-most column of the defined level at step 14, formatting the connecting border to the right of the right-most column of the defined level at step 16, and inserting a blank row above each branch of the defined level at step 18.

Figure 8B:
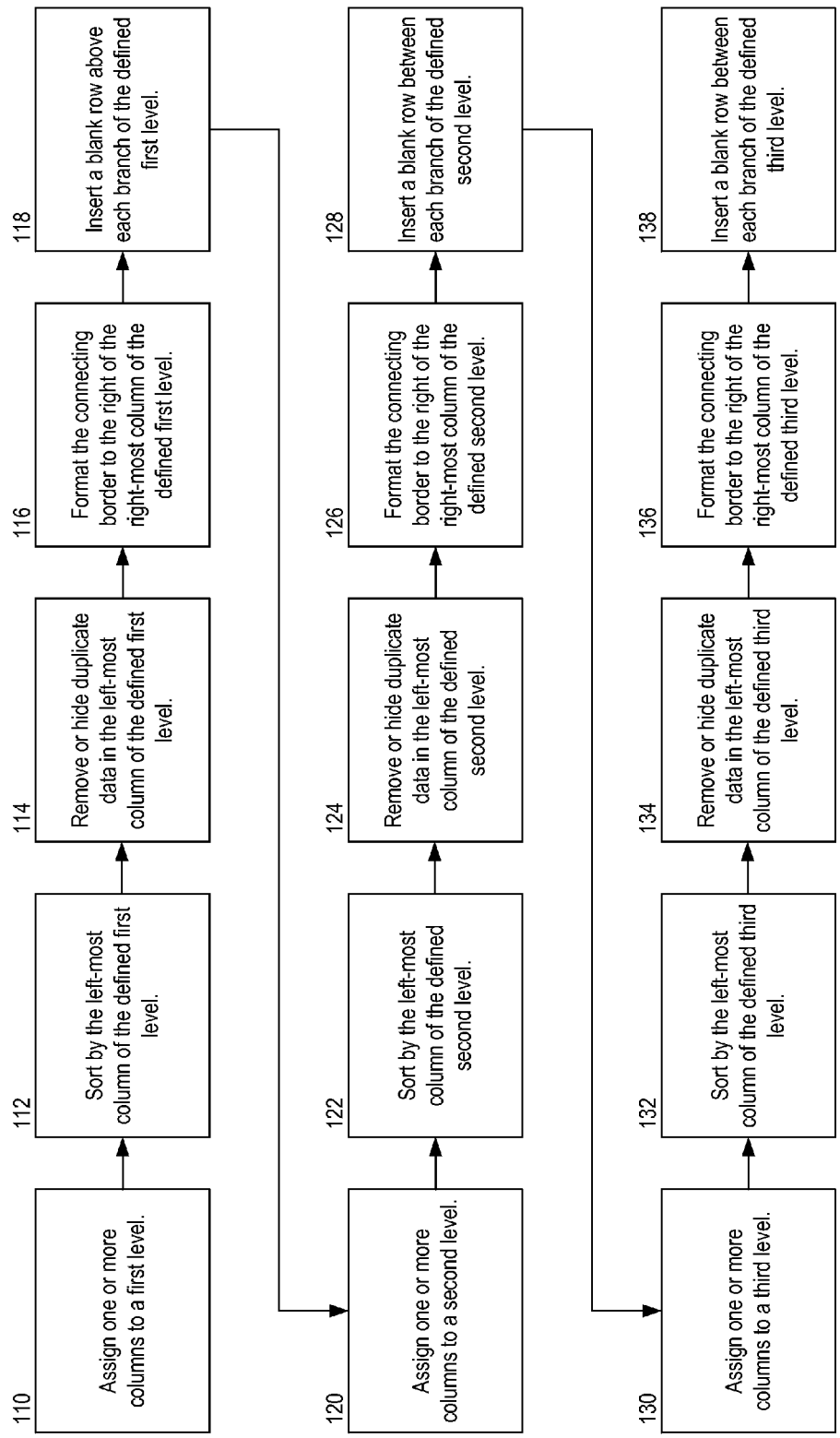
FIG. 8B illustrates an exemplary methodology by which three different levels are defined for hierarchical relationships within the data table of FIG. 1.

In accordance with one or more preferred implementations, such a methodology can be repeated several times to represent multiple hierarchical relationships within a data table. FIG. 8B illustrates an exemplary methodology by which three different levels are defined for hierarchical relationships within the data table of FIG. 1.

Starting from the data table of FIG. 1, a user selects one or more columns of the data table and assigns them to a first level at step 110 via an interface of a software application, as illustrated in FIG. 9. Preferably, this effects sorting of the selected one or more columns by the left-most column of the defined first level at step 112, as illustrated in FIG. 10. As illustrated, the data rows have been sorted by the "Brand" column such that all of the data rows with a "Brand A" value in the "Brand" column have been sorted ahead of the data rows with a "Brand B" value in the "Brand" column.

In accordance with one or more preferred implementations, duplicate entries in the left-most column of the selected one or more columns are identified. The rows which share a common entry in the left-most column of the selected one or more columns may be characterized as forming a branch for purposes of the first level.

Preferably, at step 114, duplicate data in the left-most column of the selected one or more columns is removed or hidden, as illustrated in FIG. 11. In accordance with one or more preferred implementations, some or all line borders may be rendered invisible to accentuate the level, as illustrated in FIG. 11.

Preferably, at step 116, the connecting border to the right of the right-most column of the defined first level is formatted, as illustrated in FIG. 12. In accordance with one or more preferred implementations, some or all line borders may be rendered invisible at this time to accentuate the level.

In accordance with one or more preferred implementations, at step 118, a blank row is inserted above each branch of the first level, as illustrated in FIG. 13. In accordance with one or more alternative preferred implementations, a blank row may be inserted after each branch, or may be inserted between branches, or may be inserted before each branch except the first branch. In accordance with one or more preferred implementations, some or all line borders may be rendered invisible at this time to accentuate the level.

In accordance with various preferred implementations, the steps 112,114,116,118 may be performed in various orders, and may even be performed concurrently.

In one or more preferred implementations, the steps 112,114,116,118 are performed automatically in response to assignment by a user of one or more rows to a first level. In one or more alternatively implementations, however some or all of these steps may be performed manually by a user. Further, in one or more preferred implementations, assignment of one or more rows to a first level may be performed automatically by software utilizing one or more processors.

After performance of the steps 112,114,116,118, one or more hierarchical relationships between the data in column A and columns B-F are graphically illustrated by the formatted line for the "Brand A" branch extending from the "Brand A" cell in row A, and the formatted line for the "Brand B" branch extending from the "Brand B" cell in row A. These lines may be characterized as level connecting lines, and may be characterized as connecting a cell in a parent level to cells in a child level.

A user can thereafter identify additional hierarchical relationships for graphical illustration by assigning one or more columns (or rows) to a second level. First, however, a user may want to move one or more columns around, as illustrated in FIG. 14, where the "Product" column containing all unique entries is moved to the right.

Subsequently, a user selects one or more columns of the data table and assigns them to a second level at step 120 via an interface of a software application, as illustrated in FIG. 15. Preferably, this effects sorting of the selected one or more columns by the left-most column of the defined second level at step 122, as illustrated in FIG. 16. As illustrated, the data rows have been sorted by the "Category" column such that all of the data rows with a "Shampoo" value in the "Category" column have been sorted ahead of the data rows with a "Soap" value in the "Category" column. Notably, however, sorting only sorts cells associated with the same parent. Thus, all of the cells associated with "Brand A" are sorted, and all of the cells associated with "Brand B" are sorted, but cells associated with "Brand A" are not sorted together with cells associated with "Brand B".

In accordance with one or more preferred implementations, duplicate entries in the left-most column of the selected one or more columns are identified. The rows which share a common entry in the left-most column of the selected one or more columns may be characterized as forming a branch for purposes of the second level.

Preferably, at step 124, duplicate data in the left-most column of the selected one or more columns is removed or hidden, as illustrated in FIG. 17. In accordance with one or more preferred implementations, some or all line borders may be rendered invisible to accentuate the level, as illustrated in FIG. 17.

Preferably, at step 126, the connecting border to the right of the right-most column of the defined second level is formatted, as illustrated in FIG. 18. In accordance with one or more preferred implementations, some or all line borders may be rendered invisible at this time to accentuate the level.

In accordance with one or more preferred implementations, at step 128, a blank row is inserted between branches of the second level, as illustrated in FIG. 18. In accordance with one or more preferred implementations, a row height of this inserted row may be modified to make it smaller than rows inserted with respect to branches of the first level.

Figure 19:
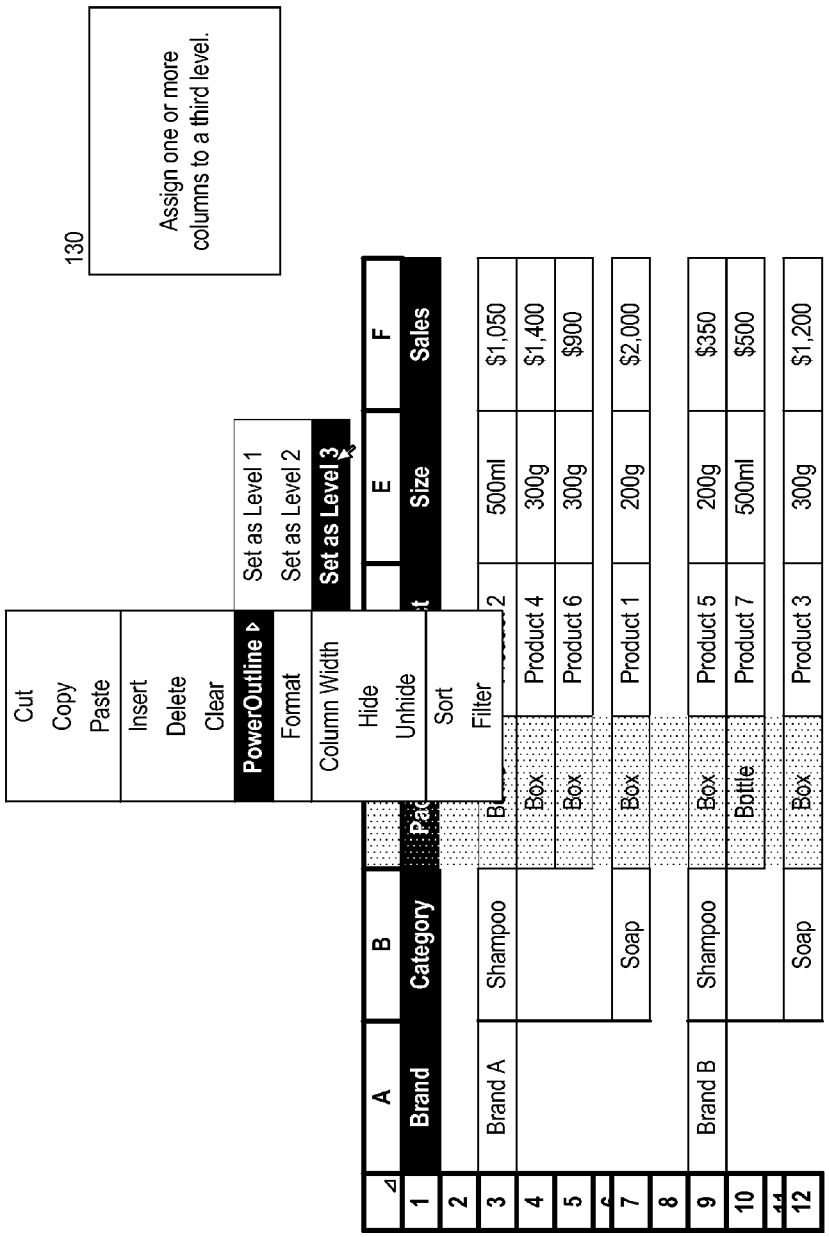

A user can thereafter identify additional hierarchical relationships for graphical illustration by assigning one or more columns (or rows) to a third level. Subsequently, a user selects one or more columns of the data table and assigns them to a third level at step 130 via an interface of a software application, as illustrated in FIG. 19. Preferably, this effects sorting of the selected one or more columns by the left-most column of the defined third level at step 132, as illustrated in FIG. 20. As illustrated, the data rows have been sorted by the "Package" column. Notably, however, the data rows have been sorted in reverse order, such that all of the data rows with a "Box" value in the "Package" column have been sorted ahead of the data rows with a "Bottle" value in the "Package" column. In accordance with one or more preferred implementations, settings may allow a user to dictate a sort methodology for all levels, and/or for a particular level.

In accordance with one or more preferred implementations, duplicate entries in the left-most column of the selected one or more columns are identified. The rows which share a common entry in the left-most column of the selected one or more columns may be characterized as forming a branch for purposes of the third level.

Preferably, at step 134, duplicate data in the left-most column of the selected one or more columns is removed or hidden, as illustrated in FIG. 21. In accordance with one or more preferred implementations, some or all line borders may be rendered invisible to accentuate the level, as illustrated in FIG. 21.

Figure 22:
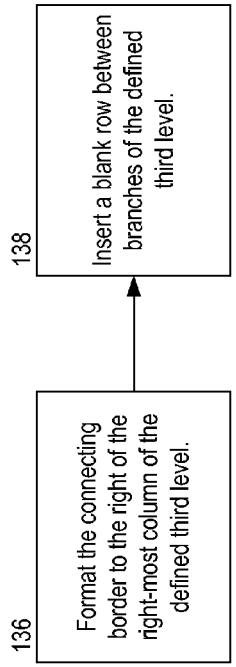
Figure 23:
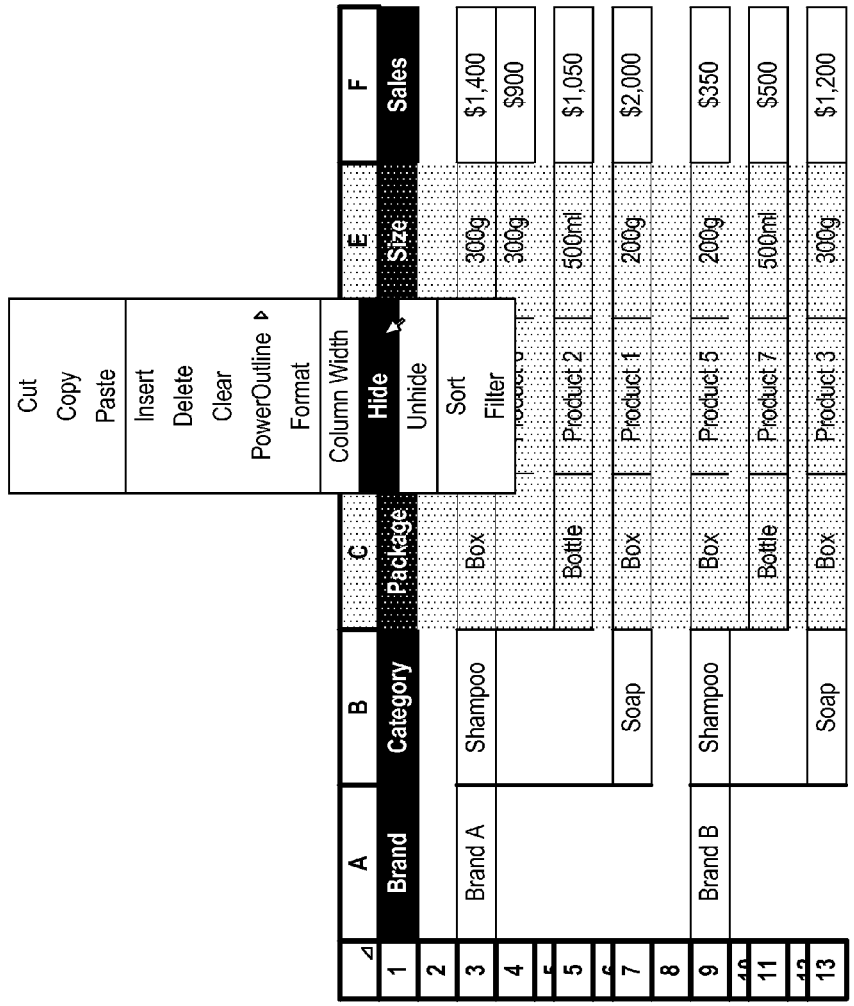

Preferably, at step 136, the connecting border to the right of the right-most column of the defined third level is formatted, as illustrated in FIG. 22. In accordance with one or more preferred implementations, some or all line borders may be rendered invisible at this time to accentuate the level.

In accordance with one or more preferred implementations, at step 138, a blank row is inserted above each branch of the third level, as illustrated in FIG. 18. In accordance with one or more preferred implementations, a row height of this inserted row may be modified to make it smaller than rows inserted with respect to branches of the first level, but the same size as rows inserted with respect to branches of the second level. In accordance with one or more preferred implementations, a row height of this inserted row may be modified to make it smaller than rows inserted with respect to branches of the first level, and smaller than rows inserted with respect to branches of the second level.

In accordance with one or more preferred implementations, in addition to being able to assign one or more columns to a level, a user can assign one or more columns within a level to a group or sub-group, and can even create multiple groups or sub-groups within a level. In accordance with one or more preferred implementations, the process for defining groups or sub-groups and modifying a data table based on such identification is substantially similar, or identical, to the process described for levels, e.g. connecting lines and spacer rows are created.

In accordance with one or more preferred implementations, users can add and represent data in hierarchical relationships, manipulate those relationships, and change the representation by using standard spreadsheet functions including filter functionality, sort functionality, hide/show functionality, formula functionality.

In accordance with one or more preferred implementations, software is configured such that, when one or more columns assigned to a data level are hidden, relationships between remaining columns are re-rendered and data re-calculated. For example, in accordance with one or more preferred implementations, starting from the data table illustrated in FIG. 22, hiding columns "C", "D", and "E", corresponding to "Package", "Product", and "Size" respectively, would collapse the data table to remove or hide the unnecessary rows, as illustrated in FIG. 24. In accordance with one or more preferred implementations, data for the remaining column which is not hidden would be totaled together if possible, as illustrated in FIG. 24, in which sales amounts for all of the products in the "Shampoo" category for each brand have been totaled together.

In accordance with one or more preferred implementations, sort and filter functionality is provided for a data table representing hierarchical relationships via the use of one or more hidden rows or columns containing metadata used for sort and filter functionality, as illustrated in FIG. 25.

In an exemplary methodology involving sort functionality, a user (or software) first selects a row (or column) to sort on, as illustrated in FIG. 26. Thereafter, a hidden sort column (or row) is populated with metadata in the form of unique values representing an ordering of the rows based on the desired sort operation, as illustrated in FIG. 27. Standard sort functionality is then used to sort the rows based on the metadata values. This allows rows in descendant levels to be moved to maintain their position relative to their parent row, as illustrated in FIG. 28. In accordance with one or more preferred implementations, cell borders may be redrawn and blank rows resized to represent the updated visible hierarchy.

In an exemplary methodology involving filter functionality, a user (or software) first selects a column (or row) to filter on, as illustrated in FIG. 29. Thereafter, a hidden sort column (or row) is populated with metadata in the form of a value representing whether the row should be visible, with a value of "1" representing a row that should be visible and a value of "0" representing a row that should not be visible, as illustrated in FIG. 30. This allows rows in descendant levels to be hidden if their parent row is hidden. Rows having a value of "0" are hidden from view, as illustrated in FIG. 31. In accordance with one or more preferred implementations, cell borders may be redrawn and blank rows resized to represent the updated visible hierarchy.

In accordance with one or more preferred implementations, a user utilizes a methodology, such as the exemplary methodology of FIG. 8A, to convert an existing data table to a data table including a representation of hierarchical relationships.

In accordance with one or more preferred implementation, a methodology such as the exemplary methodology of FIG. 8A might be used with other data sources and structures, such as, for example, where each row in table of data or data returned from a database query is defined as being assigned to a level.

Figure 32:
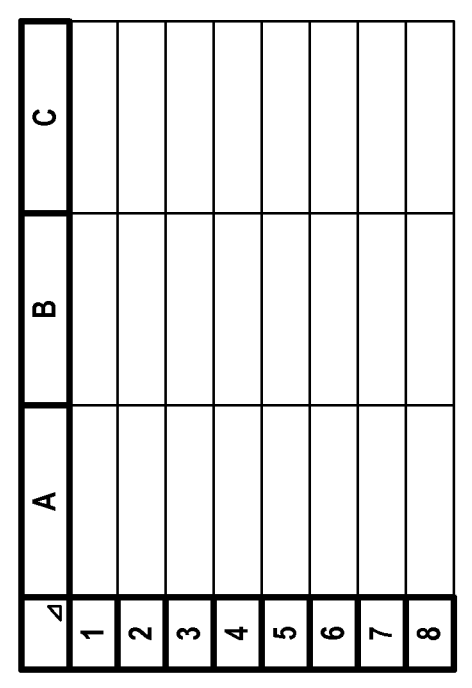

In contrast to this, in accordance with one or more preferred implementations, a data table including a representation of hierarchical relationships is developed from a blank data table based on user input. FIG. 32 illustrates an exemplary such blank data table.

Figure 33:
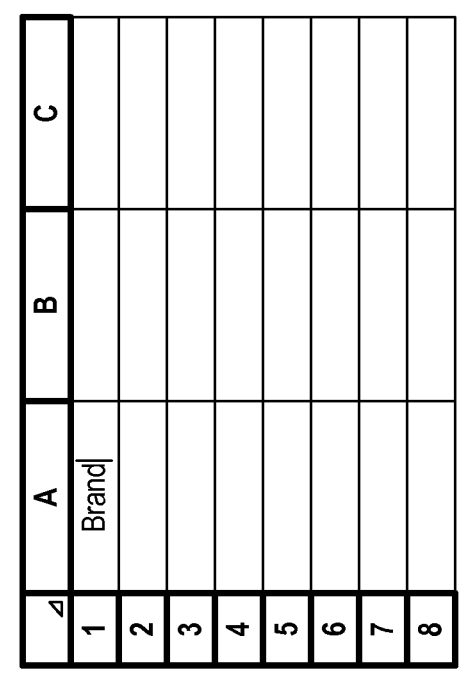
Figure 34:
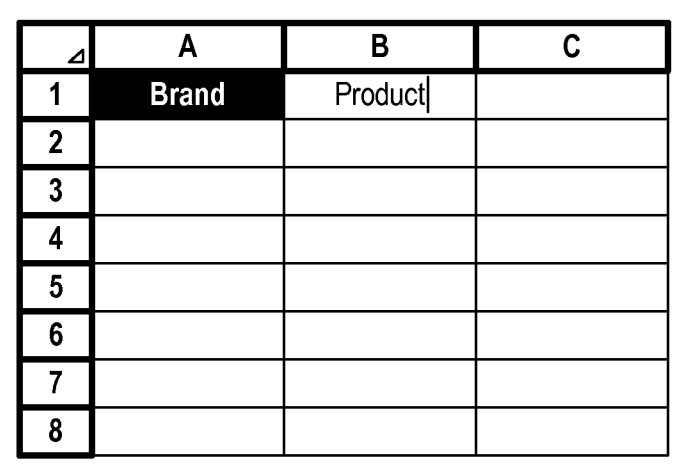

In accordance with an exemplary methodology for developing a graphical representation of hierarchical relationships, a user enters a "Brand" header into cell A1, as illustrated in FIG. 33. Preferably, either the user or software formats the "Brand" header, as illustrated in FIG. 34. The user additionally inputs a "Product" header into cell B1, as illustrated in FIG. 34.

Figure 35:
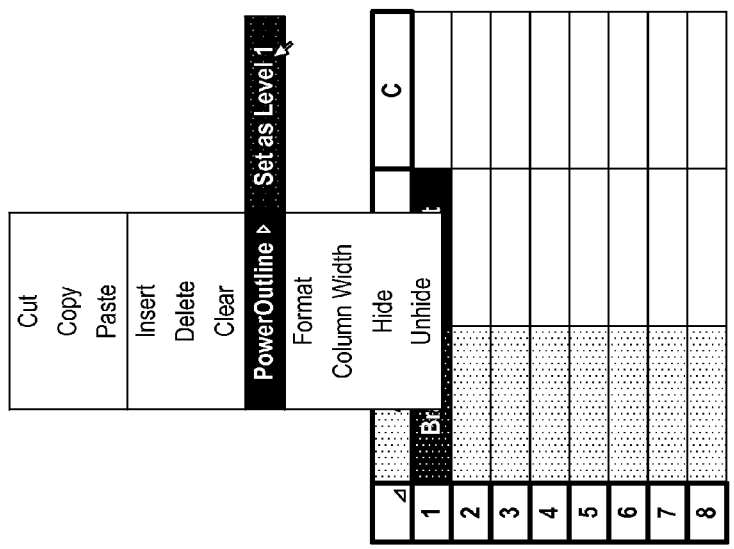
Figure 36:
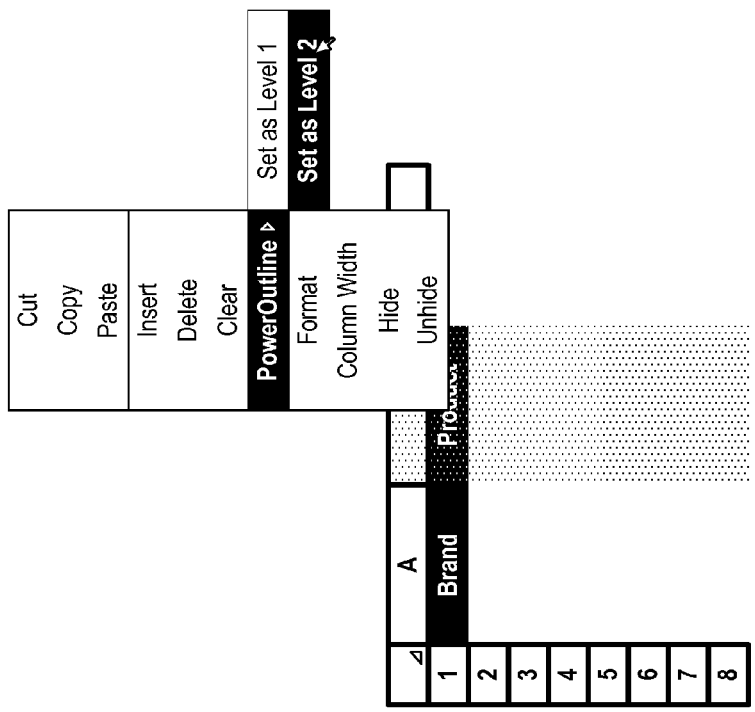

After inputting the "Brand" text, the user preferably defines column A as a first level, as illustrated in FIG. 35. The user similarly preferably defines column B as a second level, as illustrated in FIG. 36.

Figure 37:
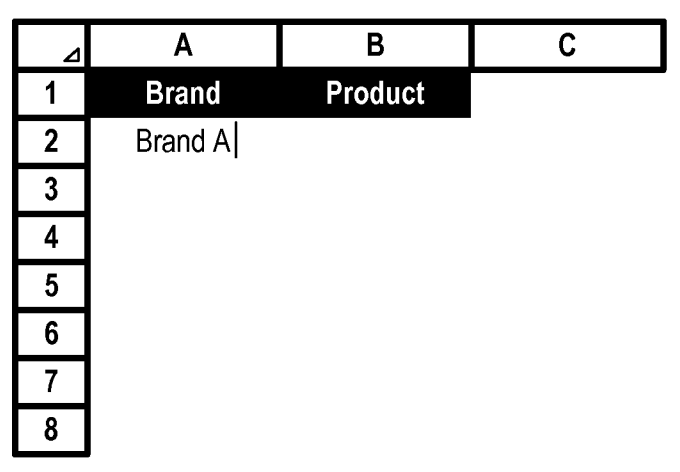
Figure 38:
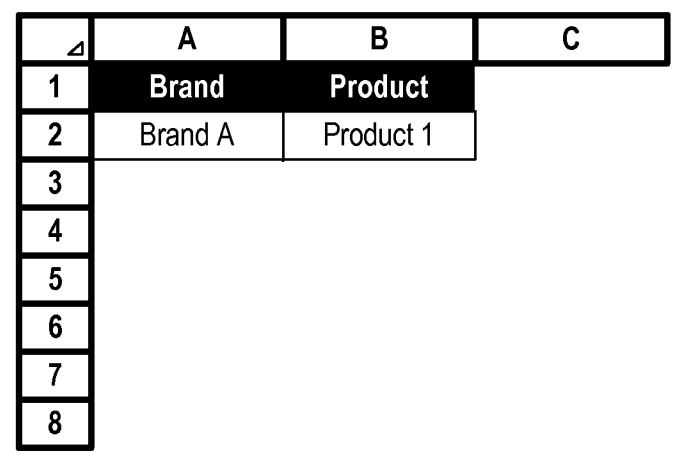

Thereafter, when a user inputs a brand identifier of "Brand A" into cell A2, as illustrated in FIG. 37, and a corresponding product associated with the brand named "Product 1" into cell A3, the hierarchical relationship between cells in adjacent levels is preferably represented by a formatted connecting line between them, as illustrated in FIG. 38. The "Brand A" cell can be characterized as being in a parent level relative to the "Product 1" cell disposed in a child level. The "Product 1" cell can be characterized as a child of the "Brand A" cell, or as a member of the "Brand A" parent group.

Figure 39:
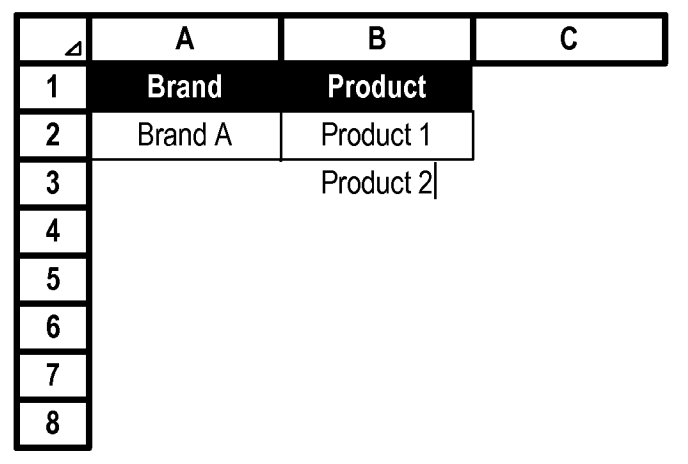
Figure 40:
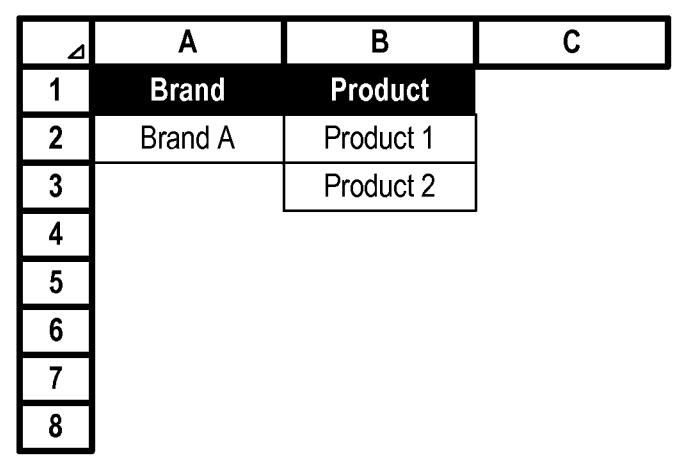

A user can subsequently input another product, for example by inputting "Product 2" into cell B2, as illustrated in FIG. 39. This cell would also be a member of the "Brand A" parent group, as illustrated in FIG. 40 by the connecting line extending from the "Brand A" cell to the "Product 2" cell.

Figure 41:
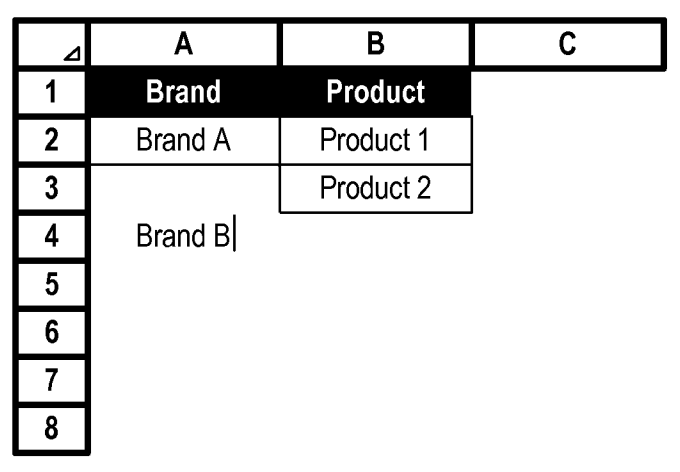

A user can add additional brands to the data table as well by inputting them into column A. For example, a user could input the text "Brand B" into cell A4, as illustrated in FIG. 41. In accordance with one or more preferred implementations, this would result in automatic formatting of the data table to insert a spacer row between the rows associated with "Brand A" and the rows associated with "Brand B", as illustrated in FIG. 42. A user can thereafter input data for one or more additional brands or products, such as a "Product 3" associated with "Brand B", as illustrated in FIG. 42.

In accordance with one or more preferred implementations, software systems and functions can automate the creation and management of data tables including hierarchical relationships based on settings with existing spreadsheet or grid data or from external data sources.

In accordance with one or more preferred implementations, systems, methods, and functionality disclosed herein is implemented in a spreadsheet or data table software application, or is implemented as a software add-on or an integrated component into an existing software application, and is used to render and manipulate hierarchical data in a spreadsheet, data table, or grid.

Figure 43:
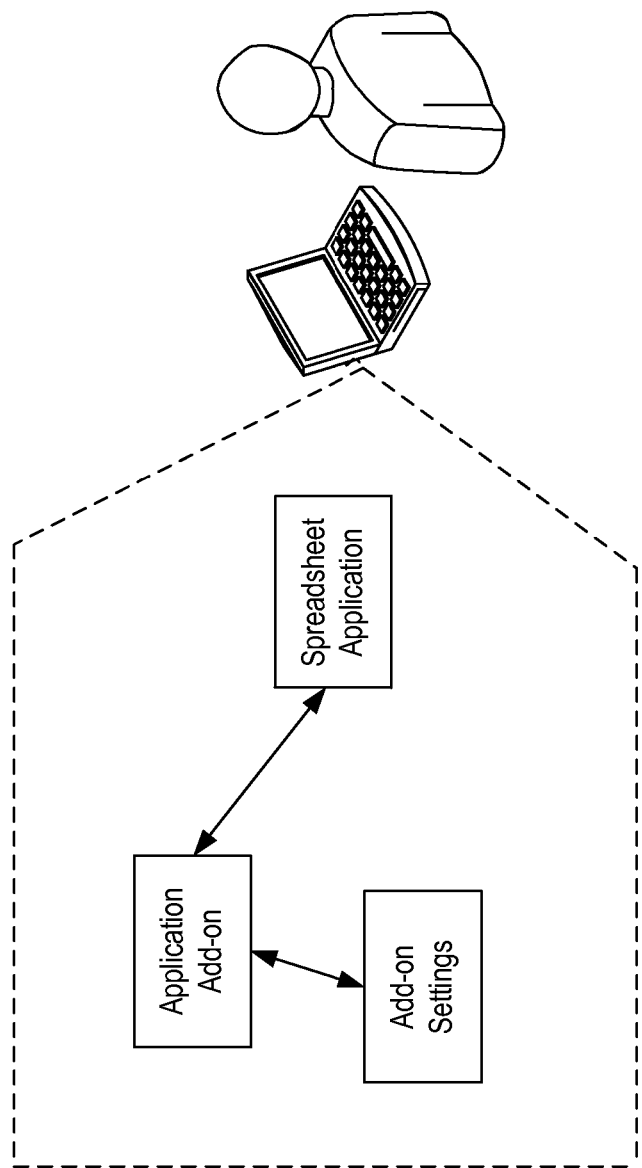
FIG. 43 illustrates, from a very high level perspective, an exemplary architecture in which functionality in accordance with disclosure herein is provided to a spreadsheet application by an application add-in informed by add-on settings.

In accordance with one or more preferred implementations, software is installed as an add-on or included in a spreadsheet or database grid application on either a personal computer or a server. Such software manages the configuration, operation, user interface and settings used to represent and manipulate data according to one or more preferred implementations. FIG. 43 illustrates, from a very high level perspective, an exemplary architecture in which functionality in accordance with disclosure herein is provided to a spreadsheet application by an application add-in informed by add-on settings.

Although described herein largely in the context of defining hierarchical relationships with respect to columns in a left to right fashion, in accordance with one or more preferred implementations, hierarchical relationships may be defined in a right to left fashion.

Similarly, although described herein largely in the context of defining hierarchical relationships with respect to columns, hierarchical relationships may also be defined with respect to rows, both in a top to bottom and bottom to top fashion.

\* \* \*

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method for converting a data table to a data table graphically presenting hierarchical relationships, the method comprising:
    (a) displaying, to a user via a display associated with an electronic device, a data table comprising a plurality of rows and columns defining a plurality of cells;
    (b) receiving, from the user via one or more input devices associated with the electronic device, an indication to assign a first set of one or more columns of the plurality of columns to a first level;
    (c) automatically sorting, in response to the received indication to assign the first set of columns to the first level, the data table based on data in a left-most column of the first set of columns;
    (d) automatically determining one or more groups of rows having duplicate data in the left-most column of the first set of columns, and, for each group, removing duplicate values in subsequent rows after the first row;
    (e) automatically formatting a connecting border to the right of the right-most column of the first set of columns such that a connecting line is established connecting the right-most column of the first set of columns and one or more associated cells in the column immediately to the right of the right-most column of the first set of columns;
    (f) inserting one or more blank rows separating the one or more groups of rows found to have duplicate data in the left-most column of the first set of columns;
    (g) receiving, from the user via one or more input devices associated with the electronic device, an indication to assign a second set of one or more columns of the plurality of columns to a second level;
    (h) in response to the received indication to assign the second set of columns to the second level, for each group of cells associated with the same parent group in the first level,
        (i) sorting the data table based on data in a left-most column of the second set of columns, such sorting only sorting together cells associated with the same parent group in the first level;
        (ii) automatically determining one or more groupings of rows having duplicate data in the left-most column of the second set of columns, and, for each grouping, removing duplicate values in subsequent rows after the first row;
        (iii) automatically formatting a connecting border to the right of the right-most column of the second set of columns such that a connecting line is established connecting the right-most column of the second set of columns and one or more associated cells in the column immediately to the right of the right-most column of the second set of columns;
        (iv) inserting one or more blank rows separating the one or more groupings of rows found to have duplicate data in the left-most column of the second set of columns.

2. The method of claim 1, wherein the electronic device comprises a computer.

3. The method of claim 1, wherein the electronic device comprises a laptop.

4. The method of claim 1, wherein the electronic device comprises a tablet computer.

5. The method of claim 1, wherein the electronic device comprises a smart phone.

6. The method of claim 1, wherein receiving, from the user via one or more input devices associated with the electronic device, an indication to assign a first set of one or more columns of the plurality of columns to a first level comprises receiving input from the user via a mouse.

7. The method of claim 1, wherein receiving, from the user via one or more input devices associated with the electronic device, an indication to assign a first set of one or more columns of the plurality of columns to a first level comprises receiving input from the user via a mouse and keyboard.

8. The method of claim 1, wherein receiving, from the user via one or more input devices associated with the electronic device, an indication to assign a first set of one or more columns of the plurality of columns to a first level comprises receiving input from the user via a touchscreen.

9. The method of claim 1, wherein displaying, to a user via a display associated with an electronic device, a data table comprising a plurality of rows and columns defining a plurality of cells comprises displaying, to a user, an interface of a spreadsheet software application.

10. The method of claim 1, wherein displaying, to a user via a display associated with an electronic device, a data table comprising a plurality of rows and columns defining a plurality of cells comprises displaying, to a user, an interface of a spreadsheet software application installed on the electronic device.

11. The method of claim 1, wherein displaying, to a user via a display associated with an electronic device, a data table comprising a plurality of rows and columns defining a plurality of cells comprises displaying, to a user, an interface of a spreadsheet software application loaded from a remote server.

12. The method of claim 1, wherein displaying, to a user via a display associated with an electronic device, a data table comprising a plurality of rows and columns defining a plurality of cells comprises displaying, to a user, a spreadsheet loaded from a remote server.

13. The method of claim 1, wherein the method further includes hiding one or more columns of the data table, and, in response thereto, adjusting display of one or more rows of the data table.

14. The method of claim 1, wherein the method further includes hiding one or more levels of the data table.

15. The method of claim 1, wherein the method further includes receiving user input corresponding to an indication to sort the data table by a particular column, and, in response thereto, modifying values in a hidden column and sorting based on the hidden column.

16. The method of claim 1, wherein the method further includes receiving user input corresponding to an indication to filter the data table, and, in response thereto, modifying values in a hidden column and changing the visibility of one or more rows based on the hidden column.

17. A method for converting a data table to a data table graphically presenting hierarchical relationships, the method comprising:
   (a) loading, at an electronic device, data into a data table comprising a plurality of rows and columns defining a plurality of cells;
   (b) automatically determining a first set of one or more columns of the plurality of columns to assign to a first level;
   (c) automatically sorting, in response to the determination to assign the first set of columns to the first level, the data table based on data in a left-most column of the first set of columns;
   (d) automatically determining one or more groups of rows having duplicate data in the left-most column of the first set of columns, and, for each group, removing duplicate values in subsequent rows after the first row;
   (e) automatically formatting a connecting border to the right of the right-most column of the first set of columns such that a connecting line is established connecting the right-most column of the first set of columns and one or more associated cells in the column immediately to the right of the right-most column of the first set of columns;
   (f) inserting one or more blank rows separating the one or more groups of rows found to have duplicate data in the left-most column of the first set of columns;
   (g) automatically determining a second set of one or more columns of the plurality of columns to assign to a second level;
   (h) in response to the determination to assign the second set of columns to the second level, for each group of cells associated with the same parent group in the first level,
      (i) sorting the data table based on data in a left-most column of the second set of columns, such sorting only sorting together cells associated with the same parent group in the first level;
      (ii) automatically determining one or more groupings of rows having duplicate data in the left-most column of the second set of columns, and, for each grouping, removing duplicate values in subsequent rows after the first row;
      (iii) automatically formatting a connecting border to the right of the right-most column of the second set of columns such that a connecting line is established connecting the right-most column of the second set of columns and one or more associated cells in the column immediately to the right of the right-most column of the second set of columns;
      (iv) inserting one or more blank rows separating the one or more groupings of rows found to have duplicate data in the left-most column of the second set of columns.

18. A non-transitory computer readable medium containing computer executable instructions for performing a method for converting a data table to a data table graphically presenting hierarchical relationships, the method comprising:
   (a) loading, at an electronic device, data into a data table comprising a plurality of rows and columns defining a plurality of cells;
   (b) automatically determining a first set of one or more columns of the plurality of columns to assign to a first level;
   (c) automatically sorting, in response to the determination to assign the first set of columns to the first level, the data table based on data in a left-most column of the first set of columns;
   (d) automatically determining one or more groups of rows having duplicate data in the left-most column of the first set of columns, and, for each group, removing duplicate values in subsequent rows after the first row;
   (e) automatically formatting a connecting border to the right of the right-most column of the first set of columns such that a connecting line is established connecting the right-most column of the first set of columns and one or more associated cells in the column immediately to the right of the right-most column of the first set of columns;
   (f) inserting one or more blank rows separating the one or more groups of rows found to have duplicate data in the left-most column of the first set of columns;
   (g) automatically determining a second set of one or more columns of the plurality of columns to assign to a second level;
   (h) in response to the determination to assign the second set of columns to the second level, for each group of cells associated with the same parent group in the first level,
      (i) sorting the data table based on data in a left-most column of the second set of columns, such sorting only sorting together cells associated with the same parent group in the first level;

(ii) automatically determining one or more groupings of rows having duplicate data in the left-most column of the second set of columns, and, for each grouping, removing duplicate values in subsequent rows after the first row;

(iii) automatically formatting a connecting border to the right of the right-most column of the second set of columns such that a connecting line is established connecting the right-most column of the second set of columns and one or more associated cells in the column immediately to the right of the right-most column of the second set of columns;

(iv) inserting one or more blank rows separating the one or more groupings of rows found to have duplicate data in the left-most column of the second set of columns.

19. The method of claim 18, wherein the computer readable medium forms part of a computer associated with a display and one or more input devices.

20. The method of claim 18, wherein the computer readable medium forms part of a server.

* * * * *